US009116454B2

(12) United States Patent
Iwanami et al.

(10) Patent No.: US 9,116,454 B2
(45) Date of Patent: Aug. 25, 2015

(54) DENSITY DETECTION APPARATUS AND METHOD AND IMAGE FORMING APPARATUS

(75) Inventors: Toru Iwanami, Kanagawa (JP); Tomohisa Suzuki, Kanagawa (JP); Makoto Hamatsu, Kanagawa (JP); Wenxiang Ge, Kanagawa (JP); Kenjo Nagata, Kanagawa (JP); Hidefumi Tanaka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 67 days.

(21) Appl. No.: 13/592,777

(22) Filed: Aug. 23, 2012

(65) Prior Publication Data

US 2013/0201497 A1 Aug. 8, 2013

(30) Foreign Application Priority Data

Feb. 8, 2012 (JP) ................................ 2012-025518

(51) Int. Cl.

| | |
|---|---|
| ***G06K 15/02*** | (2006.01) |
| ***H04N 1/52*** | (2006.01) |
| ***G03G 15/01*** | (2006.01) |
| ***G03G 15/00*** | (2006.01) |

(52) U.S. Cl.

CPC ........ *G03G 15/0189* (2013.01); *G03G 15/5058* (2013.01)

(58) Field of Classification Search

CPC . G03G 5/00; G03G 15/0189; G03G 15/5058; G06F 1/00

USPC ................................. 358/1.1-1.9, 1.11-1.18

See application file for complete search history.

(56) References Cited

U.S. PATENT DOCUMENTS

| | | | | |
|---|---|---|---|---|
| 5,991,558 | A * | 11/1999 | Emi et al. | 399/49 |
| 6,185,007 | B1 * | 2/2001 | Hayashi et al. | 358/1.9 |
| 2005/0100356 | A1 * | 5/2005 | Yang et al. | 399/49 |
| 2008/0219682 | A1 * | 9/2008 | Yamasaki et al. | 399/16 |
| 2011/0182601 | A1 * | 7/2011 | Nakatsuji et al. | 399/49 |

FOREIGN PATENT DOCUMENTS

| | | |
|---|---|---|
| JP | 04-146459 A | 5/1992 |

* cited by examiner

*Primary Examiner* — King Poon
*Assistant Examiner* — Ibrahim Siddo
(74) *Attorney, Agent, or Firm* — Sughrue Mion, PLLC

(57) ABSTRACT

A density detection apparatus includes the following elements. An image forming unit forms density detection images having different area ratios. A measuring unit measures an amount of reflected light. A storage unit stores reference values and also stores a representative value thereof. A determining unit determines a threshold for the area ratios of the density detection images on the basis of a variation among the reference values. A density obtaining unit obtains, for a density detection image having an area ratio which exceeds the threshold, a density level by using the amount of light reflected by the density detection image and the representative value, and obtains, for a density detection image having an area ratio which is equal to or smaller than the threshold, a density level by using the amount of light reflected by the density detection image, the associated reference value, and the representative value.

6 Claims, 10 Drawing Sheets

| $\Delta V_{clean}$ (V) | TONE THRESHOLD |
|---|---|
| A TO B | 40% |
| B TO C | 30% |
| C TO D | 20% |
| <D | 10% |

NOTE: D<C<B<A

DENSITY DETECTION APPARATUS AND METHOD AND IMAGE FORMING APPARATUS

CROSS-REFERENCE TO RELATED APPLICATIONS

This application is based on and claims priority under 35 USC 119 from Japanese Patent Application No. 2012-025518 filed Feb. 8, 2012.

BACKGROUND (i) Technical Field

The present invention relates to a density detection apparatus and method and an image forming apparatus.

(ii) Related Art

In order to correct the density of images formed by an image forming apparatus, a technique for forming density detection images on an image carrier and for detecting the density levels of the density detection images is known.

SUMMARY

According to an aspect of the invention, there is provided a density detection apparatus including: an image forming unit that forms plural density detection images having different area ratios on an image carrier; a measuring unit that measures an amount of light reflected by the image carrier or the plural density detection images formed on the image carrier; a storage unit that stores, as reference values, amounts of plural light components reflected by the image carrier during one revolution of the image carrier, and that also stores a representative value of the amounts of light components reflected by the image carrier during one revolution of the image carrier; a determining unit that determines a threshold for the area ratios of the plural density detection images on the basis of a variation among the reference values; and a density obtaining unit that obtains, for a density detection image having an area ratio which exceeds the threshold, a density level corresponding to the area ratio of the density detection image by using the amount of light reflected by the density detection image and the representative value, and that obtains, for a density detection image having an area ratio which is equal to or smaller than the threshold, a density level corresponding to the area ratio of the density detection image by using the amount of light reflected by the density detection image, the associated reference value, and the representative value.

BRIEF DESCRIPTION OF THE DRAWINGS

An exemplary embodiment of the present invention will be described in detail based on the following figures, wherein.

DETAILED DESCRIPTION

An exemplary embodiment of the present invention will be described below in detail with reference to the accompanying drawings.

Image Forming Apparatus

An example of the configuration of an image forming apparatus will be discussed below.

The image forming apparatus is an electrophotographic image forming apparatus that forms images on paper by using an electrophotographic developer including toner. In this exemplary embodiment, a so-called tandem, intermediate-transfer image forming apparatus will be described. The image forming apparatus may be of any type as long as it forms density detection images on an image carrier, detects the density levels of the density detection images, and corrects image density levels. The configuration of the image forming apparatus is not restricted to that described in this exemplary embodiment.

Figure 1:
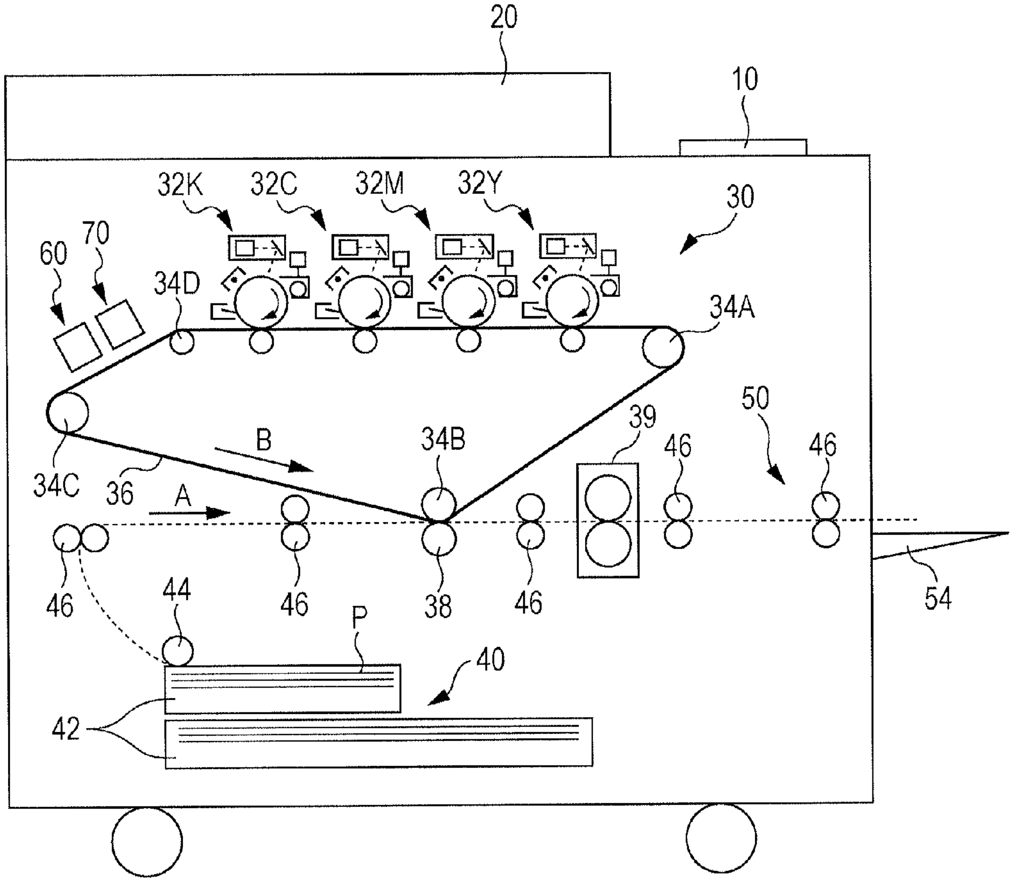
FIG. 1 is a schematic view illustrating an example of the configuration of an image forming apparatus according to an exemplary embodiment of the invention.
Figure 2:
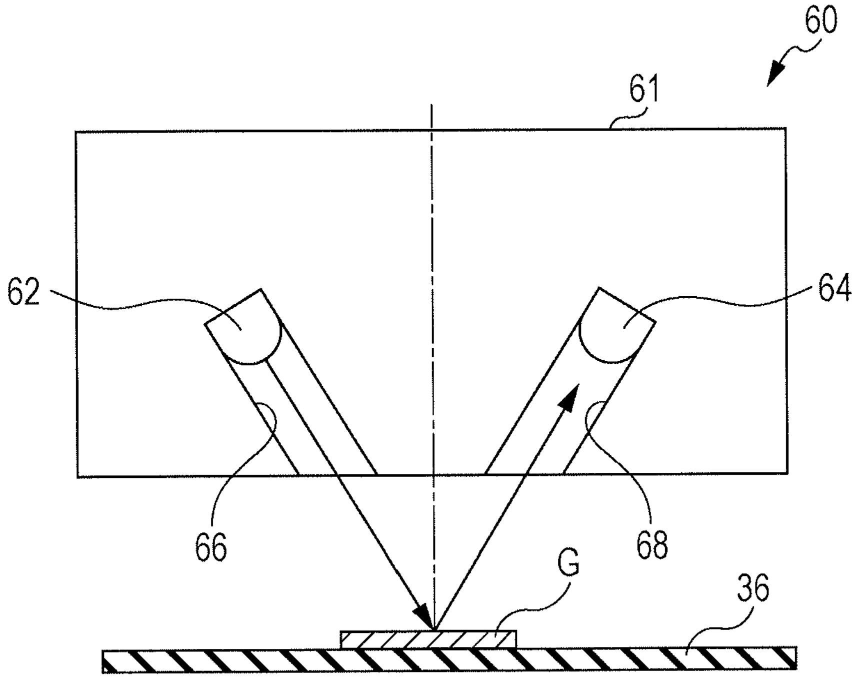
FIG. 2 schematically illustrates an example of the configuration of a light amount detector.
Figure 3:
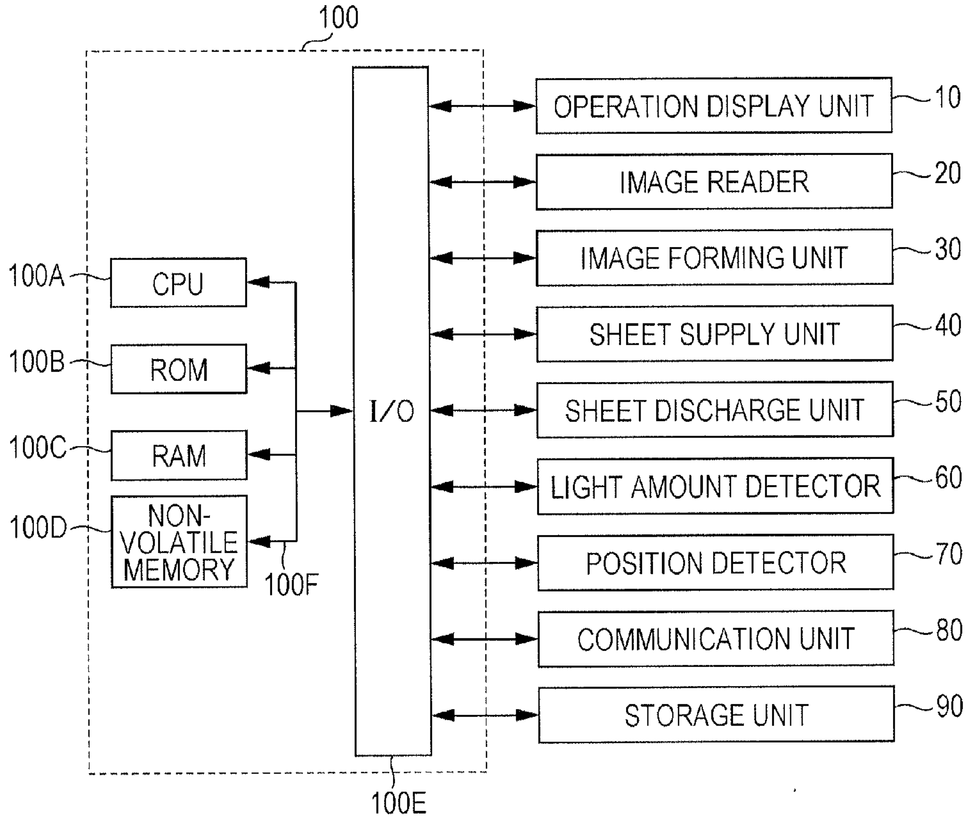
FIG. 3 is a block diagram illustrating the electrical configuration of the image forming apparatus shown in FIG. 1.

FIG. 1 is a schematic view illustrating an example of the configuration of the image forming apparatus according to this exemplary embodiment. FIG. 2 schematically illustrates an example of the configuration of a light amount detector. FIG. 3 is a block diagram illustrating the electrical configuration of the image forming apparatus shown in FIG. 1.

As shown in FIGS. 1 and 3, the image forming apparatus of this exemplary embodiment includes an operation display unit 10, an image reader 20, an image forming unit 30, a sheet supply unit 40, a sheet discharge unit 50, a light amount detector 60, a position detector 70, a communication unit 80, a storage unit 90, and a controller 100. The image forming unit 30, the sheet supply unit 40, and the sheet discharge unit 50 are disposed in the order of the sheet supply unit 40, the image forming unit 30, and the sheet discharge unit 50, along a sheet transport path indicated by the broken line in FIG. 1.

The light amount detector 60 and the position detector 70 are disposed at a position on the exterior side of an image carrier, which forms the image forming unit 30, such that they oppose the image carrier. In this exemplary embodiment, the image carrier is an intermediate transfer belt 36, which will be discussed later. The light amount detector 60 is disposed on the downstream side of an image forming unit 32 with respect to the direction in which the intermediate transfer belt 36 is moved, and measures amounts of light reflected by density detection images which are formed on the intermediate transfer belt 36 by using the image forming unit 30.

The controller 100 is constituted as a computer that controls the entire image forming apparatus and executes various operations. The controller 100 includes a central processing unit (CPU) 100A, a read only memory (ROM) 100B in which various programs are stored, a random access memory (RAM) 100C used as a work area when programs are executed, a non-volatile memory 100D in which various items of information are stored, and an input/output interface (I/O) 100E. The CPU 100A, the ROM 100B, the RAM 100C, the non-volatile memory 100D, and the I/O 100E are connected to one another via a bus 100F.

The operation display unit 10, the image reader 20, the image forming unit 30, the sheet supply unit 40, the sheet discharge unit 50, the light amount detector 60, the position detector 70, the communication unit 80, and the storage unit 90 are connected to the I/O 100E of the controller 100. The controller 100 controls the operation display unit 10, the image reader 20, the image forming unit 30, the sheet supply unit 40, the sheet discharge unit 50, the light amount detector 60, the position detector 70, the communication unit 80, and the storage unit 90.

The controller 100 obtains detection results output from the light amount detector 60 and the position detector 70 as detection signals. The image forming apparatus includes plural transport rollers 46 which are disposed along the sheet transport path indicated by the broken line shown in FIG. 1. The plural transport rollers 46 are driven by a drive mechanism (not shown), and thereby transports a sheet in accordance with an image forming operation.

The operation display unit 10 includes various buttons, such as a start button and a numeric keypad, and a touch panel used for displaying various screens, such as a warning message screen and a setting screen. With this configuration, the operation display unit 10 receives operations performed by a user and displays various items of information for a user. The image reader 20 includes a charge coupled device (CCD) image sensor, an image reading device that optically reads images formed on paper, a scanning mechanism for scanning paper, etc. With this configuration, the image reader 20 reads images formed on a document which is placed on the image reader 20 and then generates image information.

The image forming unit 30 forms images on paper by using an electrophotographic system. The image forming unit 30 includes an image forming unit 32K that forms black (K) toner images, an image forming unit 32C that forms cyan (C) toner images, an image forming unit 32M that forms magenta (M) toner images, and an image forming unit 32Y that forms yellow (Y) toner images. The image forming unit 30 includes the intermediate transfer belt 36, a second transfer device 38, and a fixing device 39. The intermediate transfer belt 36 is wound on plural rollers 34 such that it is moved in the direction indicated by the arrow B in FIG. 1. The second transfer device 38 simultaneously transfers toner images on the intermediate transfer belt 36 onto paper. The fixing device 39 fixes toner images transferred onto paper.

The image forming units 32K, 32C, 32M, and 32Y are disposed in the order shown in FIG. 1 so that a Y toner image, an M toner image, a C toner image, and a K toner image are formed on the intermediate transfer belt 36 in this order when the intermediate transfer belt 36 is moved in the direction indicated by the arrow B in FIG. 1. Hereinafter, the image forming units 32K, 32C, 32M, and 32Y will be simply referred to as "image forming unit 32" or "image forming units 32" unless it is necessary to distinguish between the individual colors. The image forming units 32 each includes a photoconductor drum, a charging device, an exposure device, a developing device, a transfer device, a cleaning device, etc. The photoconductor drums are formed such that they are rotated in the direction indicated by the arrows.

The rollers 34 include a driver roller 34A, a back support roller 34B, a tension application roller 34C, and a driven roller 34D. The intermediate transfer belt 36 is wound on the driver roller 34A, the back support roller 34B, the tension application roller 34C, and the driven roller 34D. Hereinafter, these rollers 34 will be simply referred to as "plural rollers 34" unless it is necessary to distinguish between them. The plural rollers 34 are driven by a drive mechanism (not shown). The drive roller 34A is driven to rotate by the drive mechanism, thereby causing the intermediate transfer belt 36 to move at a predetermined speed in the direction indicated by the arrow B shown in FIG. 1. The tension application roller 34C is moved outward by the drive mechanism, thereby applying a predetermined tension to the intermediate transfer belt 36.

The image forming unit 30 forms images by the following procedure.

The image forming unit 32K transfers a K toner image onto the intermediate transfer belt 36 in the following manner. The charging device charges the photoconductor drum. The exposure device then exposes the charged photoconductor drum to light corresponding to a K image, thereby forming an electrostatic latent image corresponding to the K image on the photoconductor drum. The developing device then develops the electrostatic latent image formed on the photoconductor drum by using a K toner, thereby forming a K toner image. The transfer device transfers the K toner image formed on the photoconductor drum onto the intermediate transfer belt 36.

Similarly, the image forming unit 32C transfers a C toner image onto the intermediate transfer belt 36. The image forming unit 32M transfers an M toner image onto the intermediate transfer belt 36. The image forming unit 32Y transfers a Y toner image onto the intermediate transfer belt 36. The K, C, M, and Y toner images are superposed on one another, thereby forming "superposed toner images". The second transfer device 38 simultaneously transfers the superposed toner images on the intermediate transfer belt 36 onto paper. The fixing device 39 heats and pressurizes the superposed images transferred on paper, thereby fixing the superposed images on paper.

The sheet supply unit 40 includes a sheet housing section 42, a supply mechanism for supplying sheets from the sheet housing section 42 to the image forming unit 30, etc. The supply mechanism includes a feeder roller 44 that feeds sheets from the sheet housing section 42 and transports rollers 46. Plural sheet housing sections 42 are provided in accordance with the types and the sizes of sheets. The sheet supply unit 40 feeds sheets from one of the sheet housing sections 42 and supplies the sheets to the image forming unit 30. The sheet discharge unit 50 includes a discharge section 54 to which sheets are discharged, a discharge mechanism for discharging sheets onto the discharge section 54, etc.

The light amount detector 60 is an optical sensor that irradiates a subject to be detected with detection light and that also detects an amount of light reflected by the subject. A detection signal output from the light amount detector 60 represents an amount of light reflected by the subject. The subject is the intermediate transfer belt 36 on which no density detection image is formed, or a density detection image group G formed on the intermediate transfer belt 36 (see FIG. 7). Details of density correction processing and density detection images will be given later.

As shown in FIG. 2, the light amount detector 60 includes a light emitting element 62 that emits detection light to be applied to a subject and a light receiving element 64 that receives light reflected by the subject. As the light emitting element 62, a light emitting element that emits light in a visible region or in an infrared region, such as a light emitting diode (LED), is used. As the light receiving element 64, a light receiving element having sensitivity to detection light, such as a photodiode (PD), is used. The light emitting element 62 is driven to be lit ON or OFF by a driver (not shown) in accordance with a control signal output from the controller 100. The light receiving element 64 is connected to the controller 100 via an analog-to-digital (A/D) converter (not shown) and outputs a detection signal which is converted to a digital signal by the A/D converter to the controller 100.

The light emitting element 62 and the light receiving element 64 are supported by a support member (not shown) and are housed in a housing 61. In the example shown in FIG. 2, the housing 61 includes an optical waveguide 66 that guides detection light and an optical waveguide 68 that guides reflected light. Detection light emitted from the light emitting element 62 propagates within the optical waveguide 66 and is applied to the density detection image group G formed on the intermediate transfer belt 36. Light reflected by the density detection image group G propagates within the optical waveguide 68 and is received by the light receiving element 64. In this exemplary embodiment, the light emitting element 62 and the light receiving element 64 are disposed such that light obtained as a result of being regularly reflected by the density detection image group G irradiated with detection light is received by the light receiving element 64. That is, the light amount detector 60 is a regular reflection optical sensor.

The position detector 70 is a position sensor that detects a reference mark M (see FIG. 4) attached on the intermediate transfer belt 36 so as to detect a predetermined reference position. When forming an image, the position detector 70 outputs a position detection signal, which serves as a reference to starting an image forming operation. The position detector 70, as well as the light amount detector 60, includes a light emitting element and a light receiving element, and irradiates the intermediate transfer belt 36 with light and also receives light reflected by the surface of the mark M, thereby detecting the position of the intermediate transfer belt 36. In density correction processing, which will be discussed later, various operations are performed on the basis of the position detection signal as a reference to starting an image forming operation.

The communication unit 80 is an interface through which the image forming apparatus communicates with an external apparatus via a wired or wireless communication line. The communication unit 80 receives print parameters including print attributes, such as the number of pages and the number of print copies, together with print instructions and image information concerning electronic documents. The storage unit 90 includes a storage device, such as a hard disk, and stores therein various data, such as log data, and a control program.

In this exemplary embodiment, a description will be given, assuming that a control program of the density correction processing, which will be discussed later, is stored in the storage unit 90 in advance. The control program is read and executed by the CPU 100A. The control program may be stored in another storage device, such as the ROM 100B. In this exemplary embodiment, in the storage unit 90, the association between $\Delta V_{clean}$, which is a variation range of the amount of reflected light $V_{clean}$, which will be discussed later, and the tone threshold is stored as a table in the storage unit 90 in advance.

Various drives may be connected to the controller 100. Various drives are devices that read and write data from and into computer-readable portable recording media, such as flexible disks, magneto-optical discs, compact disc (CD)-ROMs. If various drives are provided, a control program may be recorded on a portable recording medium, and may be read and executed by using a drive corresponding to the portable recording medium.

Density Detection Images

Density detection images will be discussed below.

Figure 4:
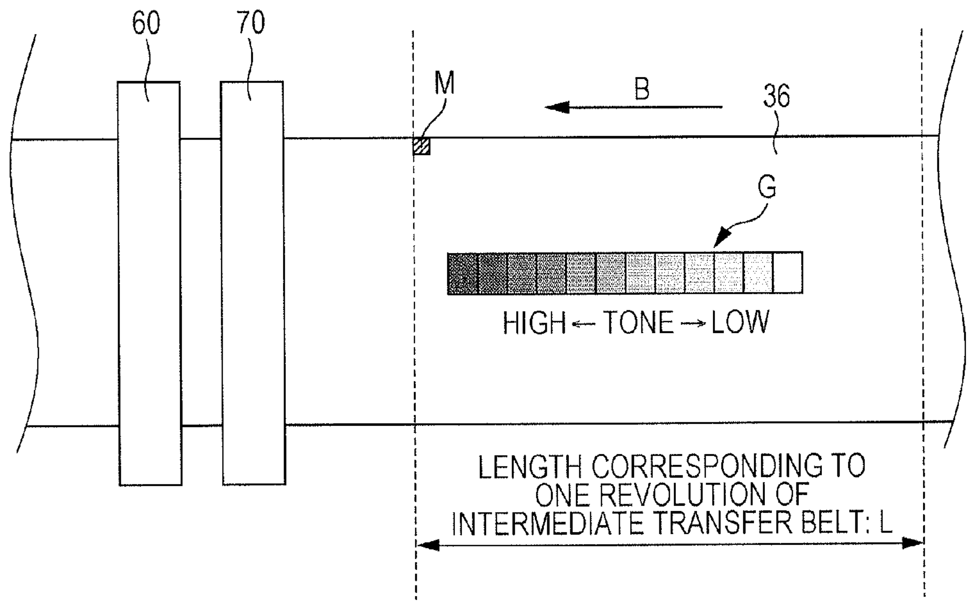
FIG. 4 schematically illustrates an example of density detection images formed on an image carrier.

FIG. 4 schematically illustrates an example of density detection images formed on an image carrier. As shown in FIG. 4, the density detection image group G includes plural density detection images P (hereinafter referred to as "patch images P"). The plural patch images Pare toner images formed of one specific color, e.g., K. The plural patch images P are formed linearly on the intermediate transfer belt 36 in the direction in which the intermediate transfer belt 36 is moved (in the direction indicated by the arrow B in FIG. 4). That is, an image group including an array of the plural patch images P is the density detection image group G. The density detection image group G is formed such that it is contained within a length L corresponding to one revolution of the intermediate transfer belt 36. The length L corresponding to one revolution of the intermediate transfer belt 36 is specified by the reference mark M on the intermediate transfer belt 36.

One patch image P is an image formed at a predetermined ratio of the area of the image to a predetermined area. In this exemplary embodiment, the plural patch images P have different area ratios. The plural patch images P are aligned such that the area ratios are increased or decreased in the direction in which plural patch images P are aligned. The area ratio of the patch image P is represented by a toner coverage ratio per unit area, e.g., 60%. When the coverage ratio is 100%, the patch image P is a solid color image. When the area ratio is 0%, the patch image P is colorless. In this example, the density detection image group G includes twelve patch images P. The area ratios of the twelve patch images P are decreased monotonically from 100% to 0% from the left side to the right side of FIG. 4.

Since the area ratios of the plural patch images P are changed in a stepwise manner, they may be referred to as "tone levels" or "tone values". The threshold of the area ratio may be referred to as a "tone threshold".

When the intermediate transfer belt 36 is moved in the direction indicated by the arrow B shown in FIG. 4, the position detector 70 detects the reference mark M on the intermediate transfer belt 36, thereby detecting a predetermined reference position. The light amount detector 60 detects the amount of light reflected by the density detection image group G formed on the intermediate transfer belt 36. In this case, the amounts of light components reflected by the patch images P are detected in order from a patch image P having a higher area ratio to a patch image P having a lower area ratio.

Figure 5:
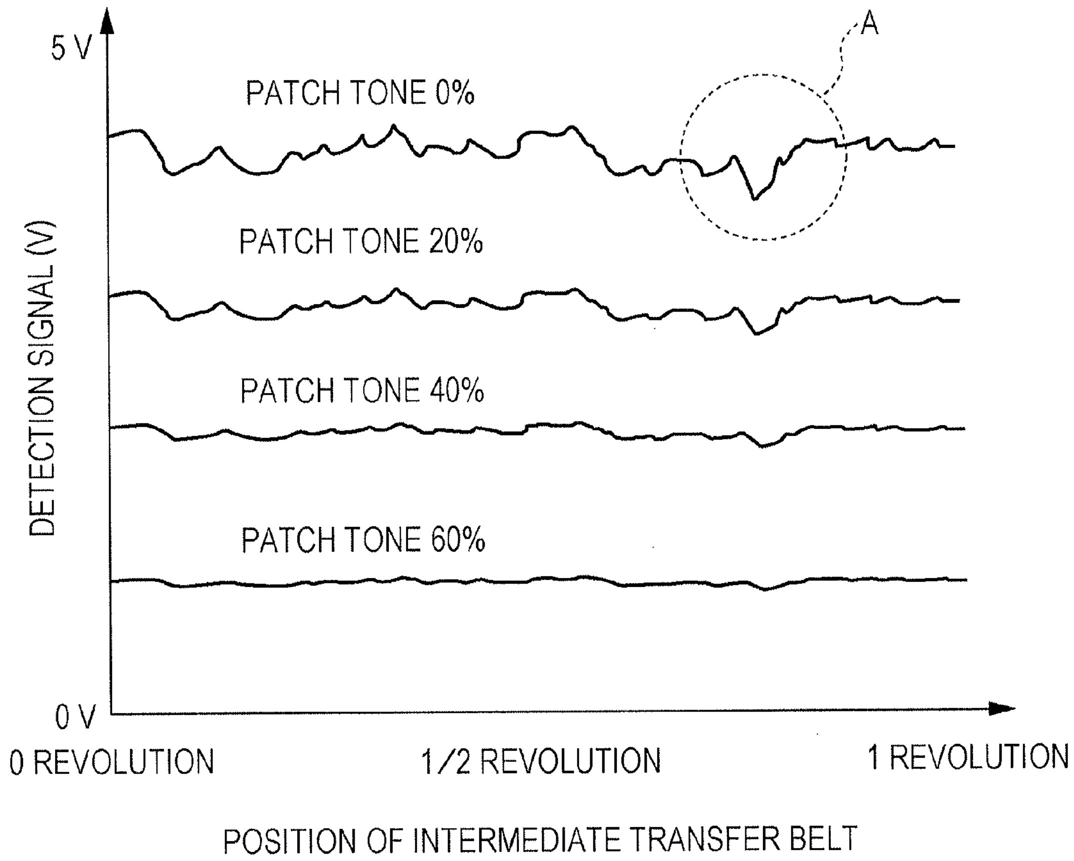
FIG. 5 illustrates a change in a detection signal output from a light amount detector over time.

FIG. 5 illustrates a change in a detection signal output from the light amount detector 60 over time. In the example shown in FIG. 5, density detection images contained within a length L corresponding to one revolution have the same area ratio. As shown in FIG. 5, the amount of light detected by the light amount detector 60 changes in accordance with the movement of the intermediate transfer belt 36. When the area ratio (patch tone) is 0%, the amount of light reflected by the intermediate transfer belt 36 is detected. When the area ratio is 20%, 40%, or 60%, the amount of light reflected by the toner images having the corresponding area ratio is detected. As the area ratio is increased, as 0%, 20%, 40%, and 60%, a change in the amount of light is decreased.

The amount of reflected light detected by the light amount detector 60 varies due to various factors, such as differences in individual optical sensors, the state in which an optical sensor is installed, the presence of an unclean area in the optical path of the optical sensor, and temperature characteristics of the optical sensor. Generally, a change in the amount of reflected light due to the above-described factors is corrected by using the amount of light $V_{clean}$ reflected by the image carrier as a reference value. Correction by using the amount of light $V_{clean}$ is effective particularly in a regular-reflection optical sensor.

However, if the state of the surface of the image carrier is changed, the amount of reflected light $V_{clean}$, which is a reference value, is also changed, which makes it difficult to obtain the correct image density. For example, flaws may occur on the surface of the image carrier over time, chemical substances generated in the image forming apparatus may become attached to the surface of the image carrier, or if the image carrier is a belt wound on plural rollers, cockles may occur on the surface of the belt depending on the tension applied to the belt, or vibrations may occur when specific portions of the belt strike the rollers.

In the example shown in FIG. 5, when the area ratio of the density detection images is 0%, the amounts of reflected light components detected by the light amount detector 60 (i.e., a detection signal output from the light amount detector 60) sharply fluctuate in accordance with the rotation of the intermediate transfer belt 36 due to the surface state of the intermediate transfer belt 36. As the area ratio is increased, the toner coverage ratio is also increased, which makes fluctuation in the detection signal output from the light amount detector 60 less noticeable. However, a sharp fluctuation in the amount of reflected light when the area ratio is 0% is still influential. In this manner, if the amount of light reflected by the intermediate transfer belt 36 sharply fluctuates due to a change in the surface state of the intermediate transfer belt 36, the amounts of light components reflected by the density detection images also vary, which makes it difficult to obtain the correct image density.

In this exemplary embodiment, every time density correction processing is performed, the threshold for the area ratio of a density detection image is determined depending on whether a change in the amount of reflected light is within a permissible range. For example, the peak in the area A indicated by the broken line becomes smaller as the area ratio is higher, and it is almost unnoticeable when the area ratio is 40%. Accordingly, the threshold is set to be 40%. In this manner, the threshold for the area ratio of a density detection image is set in accordance with the surface state of the image carrier, i.e., in accordance with the degree of the influence of a change in the amount of reflected light $V_{clean}$, which is the reference value.

If the area ratio of a density detection image is equal to or smaller than the threshold (if the density detection image has a smaller area ratio), the image density of the density detection image is determined in accordance with the surface state of the intermediate transfer belt 36. Then, density correction processing is performed by using the determined image density. As shown in FIG. 4, the density detection image group G is constituted by plural patch images P having different area ratios. Accordingly, the above-described threshold determining processing is performed for each patch image P.

Density Correction Processing

Density correction processing will now be described below.

In the image forming apparatus, density correction processing is started when predetermined conditions are satisfied. During the execution of density correction processing, a normal image forming operation is not performed. In this exemplary embodiment, the number of image forming operations is counted, and when the number of image forming operations exceeds a restricted number, density correction processing is started. The conditions for starting density correction processing may be other conditions. For example, when a predetermined period has elapsed, density correction processing may be started.

Figure 6:
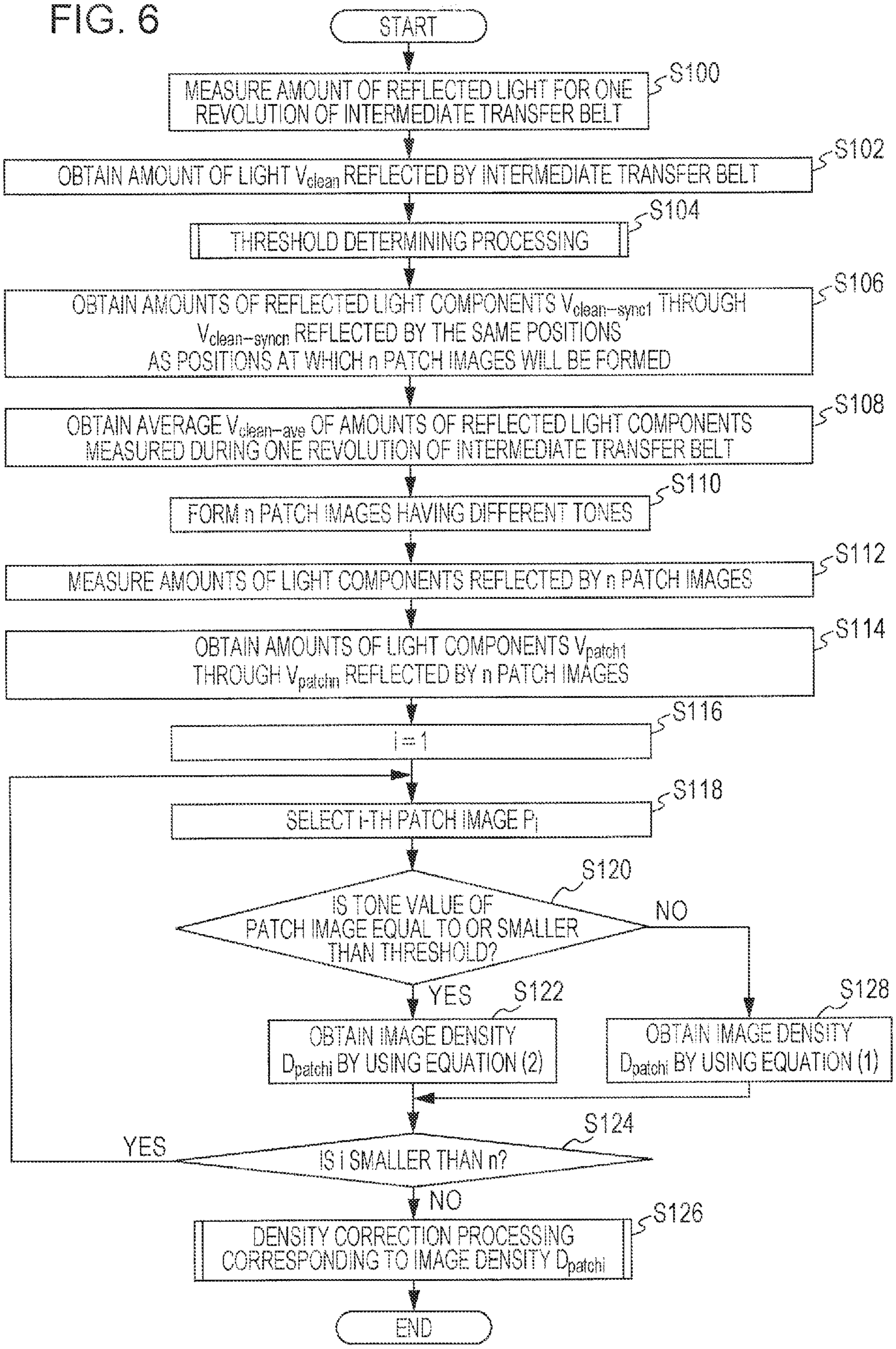
FIG. 6 is a flowchart illustrating a processing routine of density correction processing.
Figure 7:
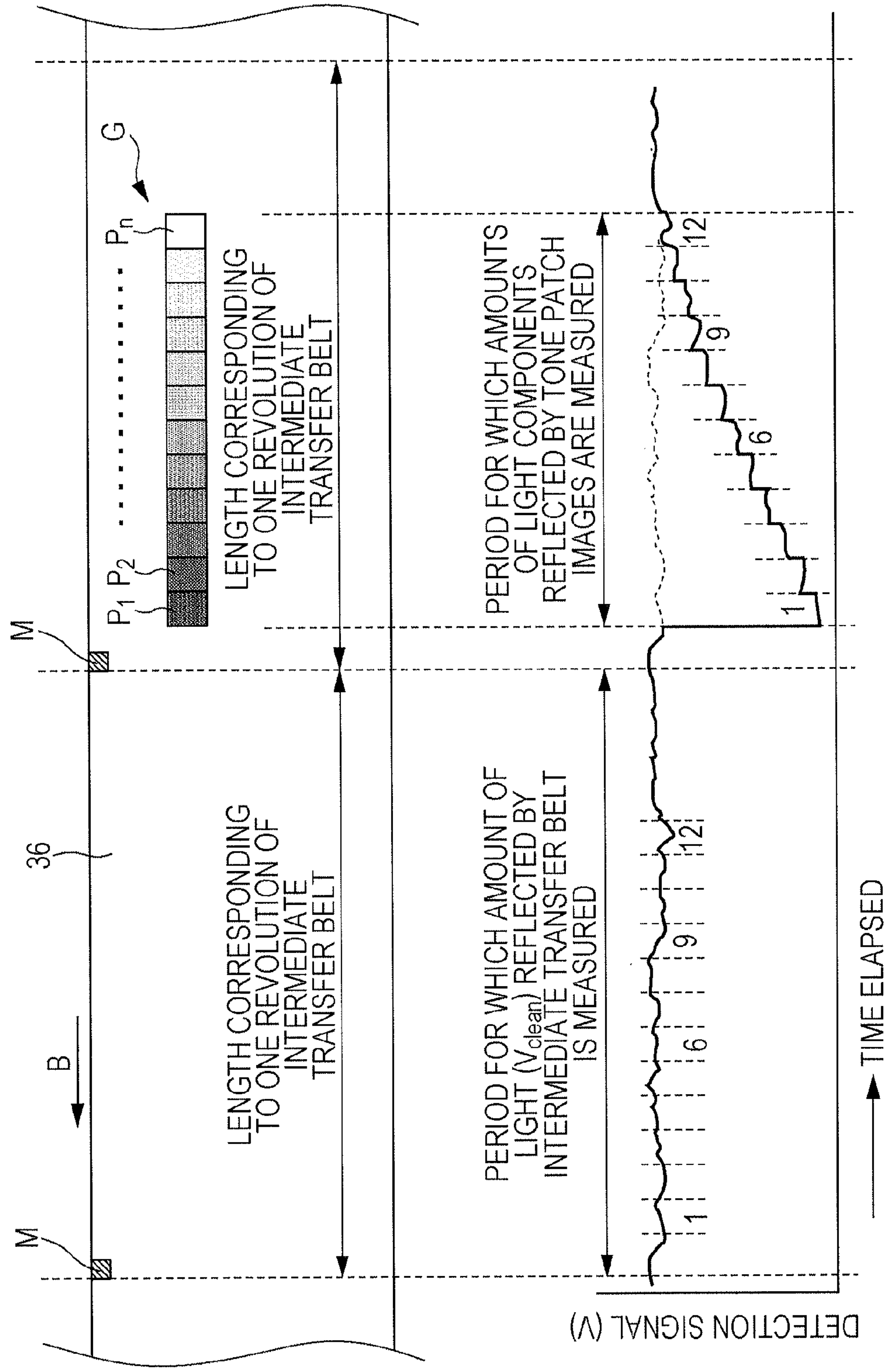
FIG. 7 illustrates a change in an output signal, output from a light amount detector, indicating the amount of light measured during one revolution of an intermediate transfer belt.
Figure 8:
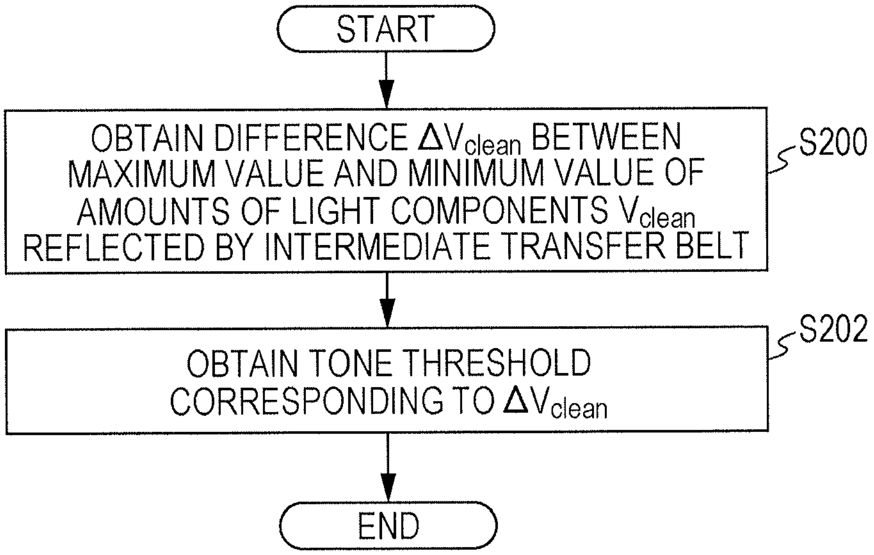
FIG. 8 is a flowchart illustrating a processing routine of threshold determining processing.
Figures 9A, 9B:
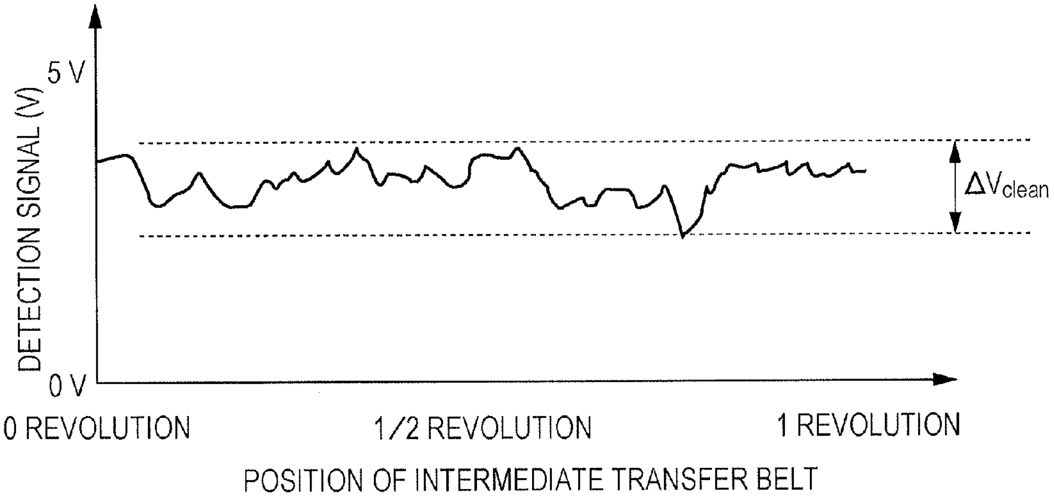
FIGS. 9A and 9B respectively illustrate $\Delta V_{clean}$ and a table indicating the association between $\Delta V_{clean}$ and a threshold (tone threshold) of the area ratio.

FIG. 6 is a flowchart illustrating a processing routine of density correction processing. FIG. 7 illustrates a change in an output signal, output from a light amount detector, indicating the amount of light reflected by an intermediate transfer belt corresponding to a length of one revolution of the intermediate transfer belt. FIG. 8 is a flowchart illustrating a processing routine of threshold determining processing. FIGS. 9A and 9B respectively illustrate $\Delta V_{clean}$ and a table indicating the relationship (association) between $\Delta V_{clean}$ and the threshold (tone threshold) of the area ratio.

The density correction processing, and the threshold determining processing, which is a subroutine of the density correction processing, are executed by the CPU 100A of the controller 100. In the density correction processing, if the area ratio of a density detection image is equal to or smaller than the threshold, the density of the density detection image is determined in accordance with the surface state of the intermediate transfer belt 36. In this manner, the correct density of the density detection image is obtained. In this exemplary embodiment, the density detection image group G includes n patch images $P_1$ through $P_n$ having different area ratios. The procedure for the density correction processing will be described below more specifically.

In step S100, the controller 100 instructs the light amount detector 60 to measure the amount of light reflected by the intermediate transfer belt 36 corresponding to a length of one revolution of the intermediate transfer belt 36. As during the execution of an image forming operation, the intermediate transfer belt 36 is moving in the direction indicated by the arrow B shown in FIG. 4 at a predetermined speed. While the intermediate transfer belt 36 is rotating through one revolution, the light amount detector 60 measures the amount of light reflected by the intermediate transfer belt 36. The light amount detector 60 then outputs a detection signal indicating an amount of reflected light to the controller 100.

In step S102, the amount of light $V_{clean}$ reflected by the intermediate transfer belt 36 during one revolution of the intermediate transfer belt 36 is obtained. As shown in FIG. 7, the amount of light $V_{clean}$ reflected by the intermediate transfer belt 36 during one revolution of the intermediate transfer belt 36 is obtained. "Period for which the amount of light reflected by the intermediate transfer belt 36 is measured" shown in FIG. 7 corresponds to one revolution of the intermediate transfer belt 36. The amount of light $V_{clean}$ is used as the reference value.

Then, in step S104, threshold determining processing for determining the threshold of density detection images is executed. The threshold determining processing will be described in detail with reference to FIG. 8. In step S200, the difference $\Delta V_{clean}$ between the maximum value and the minimum value of the amounts of light components $V_{clean}$ measured during one revolution of the intermediate transfer belt 36 is obtained (see FIG. 9A). Then, in step S202, the tone threshold associated with the obtained difference $\Delta V_{clean}$ is obtained.

In this exemplary embodiment, as shown in FIG. 9B, the association between $\Delta V_{clean}$, which indicates a range of a change in the amount of reflected light $V_{clean}$, and the tone threshold is stored in advance in the storage unit 90 as a table. For example, when $\Delta V_{clean}$ ranges from A to B, the tone threshold is 40%. Accordingly, the tone threshold associated with the difference $\Delta V_{clean}$ is obtained by referring to the table read from the storage unit 90.

Then, in step S106, the amounts of light components $V_{clean\text{-}sync1}$ through $V_{clean\text{-}syncn}$ reflected by the same positions of the intermediate transfer belt 36 as the positions at which n patch images $P_1$ through $P_n$, respectively, will be formed are obtained. The amounts of light components $V_{clean\text{-}sync1}$ through $V_{clean\text{-}syncn}$ are amounts of light components reflected by the same positions of the intermediate transfer belt 36 as the positions at which n patch images $P_1$ through $P_n$ will be formed (i.e. one revolution before the n patch images are formed). The amounts of light components $V_{clean\text{-}sync1}$ through $V_{clean\text{-}syncn}$ are used as reference values when correcting the amounts of reflected light components detected by the light amount detector 60.

Then, in step S108, the average $V_{clean\text{-}ave}$ of the amounts of reflected light components measured during one revolution of the intermediate transfer belt 36 is obtained. As shown in FIG. 7, the amount of reflected light $V_{clean}$ is measured during one revolution of the intermediate transfer belt 36, and the average $V_{clean\text{-}ave}$ of the amounts of reflected light components $V_{clean}$ measured during this period is used as the representative value.

In step S110, the controller 100 instructs the image forming unit 30 to form n patch images $P_1$ through $P_n$ having different area ratios. In synchronization with the position detection signal output from the position detector 70, as shown in FIG. 7, the image forming unit 30 forms a density detection image group G on the intermediate transfer belt 36. The density detection image group G is an image group including n patch images $P_1$ through $P_n$ linearly formed on the intermediate transfer belt 36.

Then, in step S112, the controller 100 instructs the light amount detector 60 to detect the amounts of light components reflected by the n patch images $P_1$ through $P_n$ formed on the intermediate transfer belt 36. The light amount detector 60 measures the amounts of light components reflected by the n patch images $P_1$ through $P_n$ while the intermediate transfer belt 36 is rotating through one revolution. The light amount detector 60 outputs a detection signal indicating the measured amounts of light components to the controller 100. Accordingly, in step S114, the controller 100 obtains the amounts of light components $V_{patch1}$ through $V_{patchn}$ reflected by the n patch images $P_1$ through $P_n$, respectively.

Then, in step S116, the count value "i" of the counter is set to be to 1. The count value "i" is updated every time threshold determining processing is performed for a patch image P. Then, in step S118, the i-th patch image $P_i$ is selected. Then, in step S120, it is determined whether the area ratio of the selected patch image $P_i$ is equal to or smaller than the threshold. If the result of step S120 is YES, it means that it is necessary to determine the image density in accordance with the surface state of the intermediate transfer belt 36 since the area ratio of the selected patch image $P_i$ is equal to or smaller than the threshold. The process then proceeds to step S122. If the result of step S120 is NO, it means that the image density may be determined by using a normal technique, and the process then proceeds to step S128. In step S128, the image density $D_{patchi}$ of the patch image $P_i$ is determined by using the following equation (1).

$$D_{patch}=V_{patch}/V_{clean\text{-}ave}\times K_{std} \quad (1)$$

In step S122, the image density $D_{Patchi\ of}$ the patch image $P_i$ is determined by using equation (2) used for correcting the image density. For example, in the example shown in FIG. 7, patch images $P_9$ through $P_{12}$ having low area ratios are more susceptible to the influence of a change in the amount of reflected light $V_{clean}$. Thus, it is necessary to determine the image density in accordance with the surface state of the intermediate transfer belt 36, and the image density is determine by using the following equation (2).

$$D_{patch}=V_{patch}/[V_{clean\text{-}ave}+\{(V_{clean\text{-}sync}-V_{clean\text{-}ave})\times(C_{in\_th}-C_{in\_patch})/C_{in\_th}\}]\times K_{std} \quad (2)$$

The parameters used in the above-described equations (1) and (2) (some of them have been already discussed) are defined as follows.

$D_{patch}$ density of patch image $V_{patch}$: amount of light reflected by patch image $V_{clean\text{-}ave}$ average of amounts of reflected light components measured during one revolution of intermediate transfer belt (representative value)

$V_{clean\text{-}sync}$ amount of light reflected by the same position of the intermediate transfer belt as the position at which a patch image will be formed (one revolution before the patch image will be formed) (reference value)

$C_{in\_patch}$: area ratio of patch image $C_{in\_th}$: threshold of area ratio (tone threshold)

$K_{std}$: normalized coefficient (coefficient for rounding division results to integers (0 through 255, 0 through 1023, etc.))

In equation (2), if $C_{in\_patch}=0$, $V_{patch}/V_{clean\text{-}sync}$ is used. If $C_{in\_patch}=C_{in\_th}$, $V_{patch}/V_{clean\text{-}ave}$ is used. If $C_{in\_patch}$ is greater than 0 and smaller than $C_{in\_th}$, the density levels of patch images are proportionally allocated.

Then, in step S124, it is determined whether the count value "i" is smaller than n. If the result of step S124 is YES, it means that there is a patch image P which has not been subjected to S120 (whether the area ratio is equal to or smaller than the threshold). Thus, the process returns to step S118. If the result of step S124 is NO, it means that step S120 has been performed for all the patch images P. The process then proceeds to step S126.

In step S126, density correction processing corresponding to the determined image density $D_{patchi}$ is performed, and the processing routine is completed. In the density correction processing, the correction of the image density is performed on the basis of the image density $D_{patchi}$ of the i-th patch image $D_{patchi}$ so that the output image density of an output image approximates the input image density of an input image (target value).

Modified Examples

Figure 10:
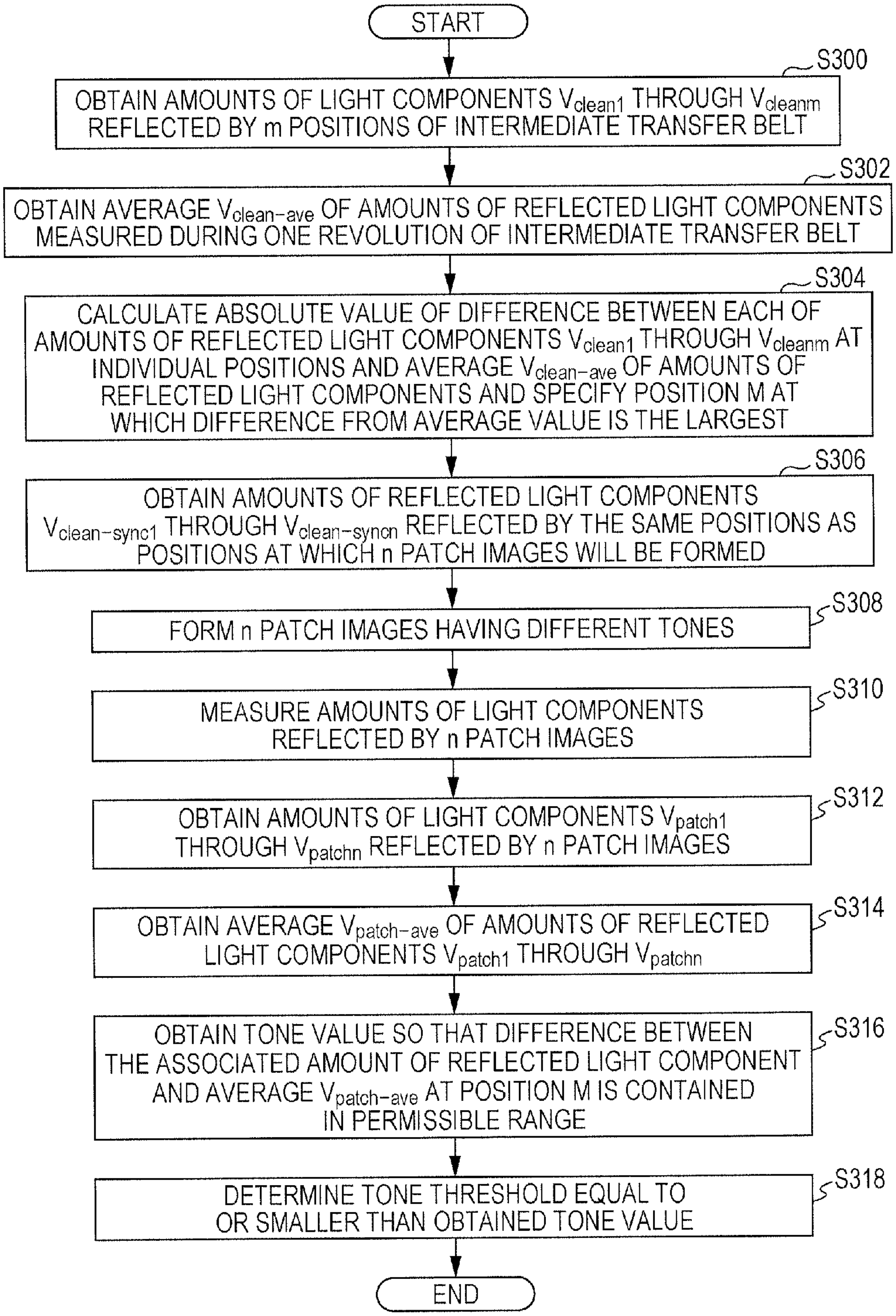
FIG. 10 is a flowchart illustrating another processing routine of threshold determining processing.

In the above-described exemplary embodiment, a table prepared in advance is used for determining the threshold of the area ratio. However, the threshold of the area ratio may be determined in another manner. For example, the amounts of light components reflected by density detection images formed on an image carrier may be actually measured, and the threshold of the area ratio may be determined on the basis of the measurement results. FIG. 10 is a flowchart illustrating another processing routine of threshold determining processing.

In step S300, the amounts of light components $V_{clean1}$ through $V_{cleanm}$ reflected by m positions of the intermediate transfer belt 36 are obtained. Then, in step S302, the average value $V_{clean\text{-}ave}$ of the amounts of reflected light components measured during one revolution of the intermediate transfer belt 36 is obtained. Then, in step S304, the absolute value of the difference between the average value $V_{clean\text{-}ave}$ and each of the amounts of light components $V_{clean1}$ through $V_{cleanm}$ at the m positions (i.e., the difference from the average value $V_{clean\text{-}ave}$) is calculated, and the position M at which the difference from the average value $V_{clean\text{-}ave}$ is the largest is specified. For example, as in the area A in FIG. 5, the position M at which a variation in the amount of reflected light caused by the surface state of the intermediate transfer belt 36 is the largest is specified.

Then, in step S306, the amounts of light components $V_{clean\text{-}sync1}$ through $V_{clean\text{-}syncn}$ reflected by the positions at which the n patch images $P_1$ through $P_n$ are formed are obtained. In the above-described exemplary embodiment, as shown in FIGS. 4 through 7, the density detection image G including patch images having area ratios from 0% to 100% are formed. In this modified example, however, only patch images P having smaller area ratios (low tones), e.g., 60% or lower, which may be influenced by a change in the amount of reflected light caused by the surface state of the intermediate transfer belt 36, may be formed.

Then, in step S308, the controller 100 instructs the image forming unit 30 to form n patch images $P_1$ through $P_n$ having different area ratios. The image forming unit 30 then forms a density detection image group G including n patch images $P_1$ through $P_n$ linearly arranged on the intermediate transfer belt 36.

Then, in step S310, the controller 100 instructs the light amount detector 60 to detect the amounts of light components reflected by the n patch images $P_1$ through $P_n$ formed on the intermediate transfer belt 36. The light amount detector 60 measures the amounts of light components reflected by the n patch images $P_1$ through $P_n$ while the intermediate transfer belt 36 is rotating through one revolution. The light amount detector 60 outputs a detection signal indicating the measured amounts of light components to the controller 100. Accordingly, in step S312, the controller 100 obtains the amounts of light components $V_{patch1}$ through $V_{patchn}$ reflected by the n patch images $P_1$ through $P_n$, respectively.

Then, in step S314, the average value $V_{patch\text{-}ave}$ of the amounts of light components $V_{patch1}$ through $V_{patchn}$ is obtained. Then, in step S316, the area ratio is determined so that the difference between the average value $V_{patch\text{-}ave}$ and the associated amount of light component $V_{patch}$ at the position M is contained in a permissible range. For example, in the example shown in FIG. 5, 40%, which makes a change in the amount of light unnoticeable, is determined as the area ratio so that the difference between the average value $V_{patch\text{-}ave}$ and the corresponding amount of light component is contained in the permissible range. Then, in step S118, the area ratio is determined as the tone threshold. The processing routine is then completed.

In the above-described exemplary embodiment, the association between $\Delta V_{clean}$, which indicates a range of a change in the amount of reflected light $V_{clean}$, and the tone threshold is stored in a table in advance. Alternatively, the association between $\Delta V_{clean}$ and the tone threshold may be obtained when necessary. For example, when the surface state of an image carrier, i.e., an intermediate transfer belt, is changed, the association between $\Delta V_{clean}$ and the tone threshold may be obtained. More specifically, after the image carrier is replaced by a new one, or after maintenance of the members contained in a transfer apparatus is performed, the above-described association may be regularly obtained in accordance with the condition of the use of the image carrier.

In the above-described exemplary embodiment, the amounts of light components $V_{clean\text{-}sync1}$ through $V_{clean\text{-}syncn}$ reflected by the same positions of the intermediate transfer belt 36 as the positions at which n patch images $P_1$ through $P_n$ will be formed (one revolution before the n patch images will be formed) are obtained. Alternatively, the amounts of light components $V_{clean\text{-}sync1}$ through $V_{clean\text{-}syncn}$ at a time several revolutions before the n patch images will be formed may be obtained. Additionally, after the amounts of light components reflected by the patch images P are measured, the patch images may be erased, and then, the amount of light reflected by the intermediate transfer belt 36 may be obtained. However, since the surface state of the image carrier changes momentarily, the amount of light reflected by the intermediate transfer belt 36 may preferably be obtained in a short period of time after the amounts of light components reflected by the patch images P are measured.

In the above-described exemplary embodiment, the average value $V_{clean\text{-}ave}$ of the amounts of reflected light components $V_{clean}$ measured during one revolution of the intermediate transfer belt 36 is used as the representative value of the amounts of reflected light components. However, any value which represents the amounts of reflected light components for one revolution of the intermediate transfer belt 36 may be used. For example, the median or the mode may be used as the representative value.

The configurations of the density detection apparatus and the image forming apparatus discussed in the above-described exemplary embodiment are only examples, and may be changed without departing from the spirit of the invention. For example, the image carrier may be replaced by a drum, and the orders of step numbers of the individual flowcharts may be changed.

The foregoing description of the exemplary embodiment and the modified examples of the present invention has been provided for the purposes of illustration and description. It is not intended to be exhaustive or to limit the invention to the precise forms disclosed. Obviously, many modifications and variations will be apparent to practitioners skilled in the art. The embodiment and the modified examples chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A density detection apparatus comprising:

an image forming unit configured to form a plurality of density detection images having different area ratios on an image carrier;

a measuring unit configured to measure a first amount of light reflected by the image carrier before the plurality of density detection images are formed thereon and configured to measure a second amount of light reflected by the plurality of density detection images formed on the image carrier;

a storage unit configured to store, as a reference value, the first amount of light reflected by the image carrier during one revolution of the image carrier before the plurality of density detection images are formed thereon;

a determining unit configured to determine, each time a density correction processing is started, a threshold corresponding to the plurality of density detection images on the basis of the reference value; and a density obtaining unit configured to obtain, based on the determined threshold, a respective plurality of density levels corresponding to the plurality of density detection images, wherein the determining unit is configured to specify a position of the image carrier at which a difference between the reference value and an average value of the first amount of light is large during one revolution of the image carrier, and configured to cause the density detection apparatus to repeat the density correction processing by (i) causing the image forming unit to form the plurality of density detection images having different area ratios on the image carrier, (ii) causing the measuring unit to measure the second amount of light reflected by the plurality of density detection images formed on the image carrier, and (iii) determining the threshold corresponding to the plurality of density detection images so that a change in the amount of light reflected by one of the density detection images located at the specified position will be equal to or smaller than a predetermined permissible value.

2. The density detection apparatus according to claim 1, wherein the determining unit is configured to determine the threshold corresponding to the plurality of density detection images on the basis of a range of variation of the reference value.

3. An image forming apparatus comprising:

an image forming unit configured to form a plurality of density detection images having different area ratios on an image carrier;

a measuring unit configured to measure a first amount of light reflected by the image carrier before the plurality of density detection images are formed thereon and configured to measure a second amount of light reflected by the plurality of density detection images formed on the image carrier;

a storage unit configured to store, as a reference value, the first amount of light reflected by the image carrier during one revolution of the image carrier before the plurality of density detection images are formed thereon;

a determining unit configured to determine, each time a density correction processing is started, a threshold corresponding to the plurality of density detection images on the basis of the reference value;

a density obtaining unit configured to obtain, based on the determined threshold, a respective plurality of density levels corresponding to the plurality of density detection images; and a correcting unit configured to correct an output image density on the basis of the respective plurality of density levels corresponding to the plurality of density detection images, wherein the determining unit is configured to specify a position of the image carrier at which a difference between the reference value and an average value of the first amount of light is large during one revolution of the image carrier, and configured to cause the density detection apparatus to repeat the density correction processing by (i) causing the image forming unit to form the plurality of density detection images having different area ratios on the image carrier, (ii) causing the measuring unit to measure the second amount of light reflected by the plurality of density detection images formed on the image carrier, and (iii) determining the threshold corresponding to the plurality of density detection images so that a change in the amount of light reflected by one of the density detection images located at the specified position will be equal to or smaller than a predetermined permissible value.

4. The image forming apparatus of claim 3, wherein the determining unit is configured to determine the threshold corresponding to the plurality of density detection images on the basis of a range of variation of the reference value.

5. A density detection method comprising:

measuring a first amount of light reflected by an image carrier before a plurality of density detection images having different area ratios are formed on the image carrier and measuring a second amount of light reflected by the plurality of density detection images formed on the image carrier;

storing, as a reference value, the first amount of light reflected by the image carrier during one revolution of the image carrier before the plurality of density detection images are formed thereon;

determining, each time a density correction processing is started, a threshold corresponding to the plurality of density detection images on the basis of the reference value; and obtaining, based on the determined threshold, a respective plurality of density levels corresponding to the plurality of density detection images, wherein the determining further comprises specifying a position of the image carrier at which a difference between the reference value and an average value of the first amount of light is large during one revolution of the image carrier, and causing repetition of the density correction processing by (i) causing formation of the plurality of density detection images having different area ratios on the image carrier, (ii) causing measurement of the second amount of light reflected by the plurality of density detection images formed on the image carrier, and (iii) determining the threshold corresponding to the plurality of density detection images so that a change in the amount of light reflected by one of the density detection images located at the specified position will be equal to or smaller than a predetermined permissible value.

6. The density detection method of claim 5, wherein the determining the threshold comprises determining the threshold corresponding to the plurality of density detection images based on a range of variation of the reference value.

* * * * *